(12) United States Patent
Parks et al.

(10) Patent No.: US 8,619,261 B2
(45) Date of Patent: Dec. 31, 2013

(54) OPTICAL DYNAMIC NON-LOCALITY INDUCTION BIT

(75) Inventors: Allen D. Parks, Spotsylvania, VA (US);
Scott E. Spence, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 209 days.

(21) Appl. No.: 13/199,507

(22) Filed: Aug. 24, 2011

(65) Prior Publication Data
US 2013/0050707 A1 Feb. 28, 2013

(51) Int. Cl.
*G01B 9/02* (2006.01)

(52) U.S. Cl.
USPC .......................................... 356/450

(58) Field of Classification Search
USPC .......................................... 356/450
See application file for complete search history.

(56) References Cited

U.S. PATENT DOCUMENTS

| | | | |
|---|---|---|---|
| 5,732,139 A | 3/1998 | Lo et al. | 380/28 |
| 5,999,285 A | 12/1999 | Brandt et al. | 359/112 |
| 6,583,881 B2 * | 6/2003 | Williams et al. | 356/450 |
| 7,006,635 B2 | 2/2006 | Parks et al. | 380/263 |
| 7,135,700 B2 | 11/2006 | Lofts | 257/24 |
| 7,304,314 B2 | 12/2007 | Zaugg | 250/458.1 |
| 7,408,637 B2 | 8/2008 | Freeling et al. | 356/317 |
| 7,831,048 B2 | 11/2010 | Kastella et al. | 380/256 |
| 8,149,494 B1 * | 4/2012 | Spence | 359/288 |
| 2008/0068721 A1 * | 3/2008 | Murnan et al. | 359/629 |
| 2010/0021181 A1 * | 1/2010 | Foguel et al. | 398/183 |

OTHER PUBLICATIONS

Tollaksen et al. "Quantum interference experiments, modular variables and weak measurements" New J. of Phys. 12 013023 (2010).*
G. G. Gillett et al., "Experimental Feedback Control of Quantum Systems Using Weak Measurements", *Phys. Rev. Lttrs.* 104(8) 080503(4) (2010), http://arxiv.org/PS_cache/arxiv/pdf/0911/0911.3698v2.pdf.
A. Tonomura et al., "Demonstration of single electron buildup of an interference pattern", *Am. J. Phys.* 57 117-20 (1989). https://www.u-cursos.cl/ingenieria/2007/2/FI34A/1/material_docente/objeto/139739.
Y. Aharonov et al., "Modular Variables . . . ", *Int. J. Theor. Phys.* 2 213-19 (1969). http://www.tau.ac.il/~yakir/yahp/yh142.pdf.

(Continued)

*Primary Examiner* — Gregory J Toatley
*Assistant Examiner* — Dominic J Bologna
(74) *Attorney, Agent, or Firm* — Gerhard W. Thielman, Esq.

(57) ABSTRACT

A quantum dynamical non-locality device is provided for establishing a photon traveling along a path in a binary state. The device includes twin Mach-Zehnder interferometer (MZI), a shutter and a detector. The twin MZI includes first and second right-isosceles triangle prisms, corresponding first and second trombone mirrors, and corresponding first and second spacers. The prisms join at a beam-splitter interface. The mirrors reflect the photon by an offset substantially perpendicular to photon's travel direction. The spacers are respectively disposed between their respective prisms and mirrors to produce corresponding spatial gaps. The path through the prisms includes traversing spacers and gaps. The detector detects a quantum state of the photon after passing the prisms and the mirrors. The shutter switches to one of disposed within and removed therefrom the first gap. The shutter shifts said quantum state of the photon.

7 Claims, 1 Drawing Sheet

(56) References Cited

OTHER PUBLICATIONS

Y. Aharonov et al., "Deterministic Quantum Interference Experiments" *Int. J. Theor. Phys.* 3 443-48 (1970). http://www.tau.ac.il/~yakir/yahp/yh140.pdf.

J. Tollaksen et al., "Quantum interference experiments, modular variables and weak measurements" *New J. of Phys.* 12 013023 (2010). http://arxiv.org/PS_cache/arxiv/pdf/0910/0910.4227v1.pdf.

S. E. Spence et al., "Experimental Evidence for a Dynamical Non-Locality Induced Effect in Quantum Interference Using Weak Values" (2010). http://arxiv.org/PS_cache/arxiv/pdf/1010/1010.3289v1.pdf.

I. M. Duck et al., "The sense in which a 'weak measurement' of a spin-½particle's spin component yields a value 100" *Phys. Rev. D* 40 2112-17 (1989). http://prd.aps.org/pdf/PRD/v40/i6/p2112_1.

A. Parks et al., "Observation and measurement of an optical AAV effect" *Proc. Roy. Soc. Lond. A*, 454 2997-3008 (1990).

Y. Aharonov et al., "How the Result of a Measurement of a Component of the Spin of a Spin-½ Particle Can Turn Out to be 100", *Phys. Rev. Ltrs*, 60(1988), 14 1351-54. http://www.tau.ac.il/~vaidman/lvhp/m8.pdf.

Y. Aharonov et al., "Properties of a quantum system . . . " *Phys. Rev. A*, 41 (1990) http://pra.aps.org/pdf/PRA/v41/il/p11_1.

N. W. M. Ritchie et al., "Realization of a Measurement of a 'Weak Value'", *Phys. Rev. Lett*, 66 (1991) 1107-1110.

P. Dixon et al., "Ultrasensitive Beam Deflection Measurement via Interferometric Weak Value Amplification", *Phys. Rev. Lett*, 102 173601 (2009). http://arxiv.org/PS_cache/arxiv/pdf/0906/0906.4828v1.pdf.

\* cited by examiner

US 8,619,261 B2

OPTICAL DYNAMIC NON-LOCALITY INDUCTION BIT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to quantum gates. In particular, the invention relates to shifting the quantum state of a photon along a path using weak measurement based on switchable introduction of a shutter.

Because quantum interference differs fundamentally from the interference phenomena of classical physics, this phenomenon has remained a continuing topic for discussion and debate since the early days of quantum theory. The essence of this difference is embodied in the two-slit experiment. From both the classical and Schrödinger wave perspectives, the resulting two slit interference pattern is easily described in terms of the overlapping contributions of the wave which have passed through each slit. The wave perspective also explains the disappearance of the interference pattern when one of the slits is closed.

However, interference experiments using low intensity electron or photon beams in which only one particle at a time passes through a two-slit apparatus have shown that the accumulated effect when both slits are open is an interference pattern like that produced by higher intensity ensembles and that the pattern disappears when one slit is closed, as described by A. Tonomura et al. in "Demonstration of single electron buildup of an interference pattern", *Am. J. Phys.* 57 117-20 (1989).

SUMMARY

Conventional quantum switches for altering quantum state yield disadvantages addressed by various exemplary embodiments of the present invention. In particular, various exemplary embodiments provide quantum dynamical non-locality device is provided for establishing a photon traveling along a path in a binary state.

In various exemplary embodiments, the device includes twin Mach-Zehnder interferometer (MZI), a shutter and a detector. The twin MZI includes first and second right-isosceles triangle prisms, corresponding first and second trombone mirrors, and corresponding first and second spacers. The prisms join at a beam-splitter interface. The mirrors reflect the photon by an offset substantially perpendicular to photon's travel direction. The spacers are respectively disposed between their respective prisms and mirrors to produce corresponding spatial gaps.

In various exemplary embodiments, the path through the prisms includes traversing spacers and gaps. The detector detects a quantum state of the photon after passing the prisms and the mirrors. The shutter switches to one of disposed within and removed therefrom the first gap. The shutter shifts said quantum state of the photon.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
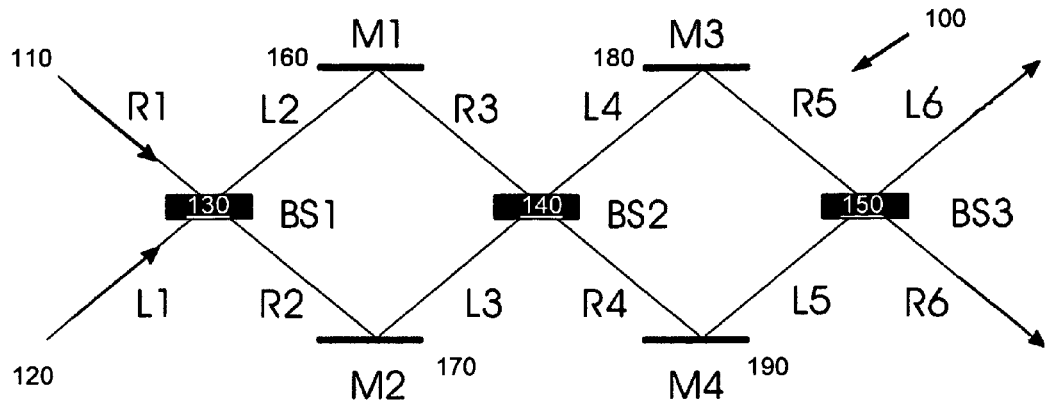
FIG. 1 is a plan diagram of a twin Mach-Zehnder Interferometer (MZI)

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

This disclosure describes exemplary embodiments of a quantum dynamical non-locality device called the Optical Dynamical Non-Locality Induction Bit (ODNIB). The exemplary ODNIB constitutes a small monolithic twin consecutive Mach-Zehnder interferometer (MZI) in which: (i) weak measurements of a pre- and post-selected photon current are used to establish and maintain a 0/1 binary state in the first MZI; and (ii) the effect induced by non-local exchanges of modular momentum in the second MZI are used to change the binary state of the first MZI. The ODNIB operates with either single photon currents or classically intense coherent light.

Theories of modular momentum, dynamical non-locality, weak measurements, and weak values are briefly summarized in the following paragraphs. A description of the device and its operation are subsequently presented. Applications of such devices include providing a quantum gate employed to solve cryptographic problems. In such an application, the second MZI operates to control the first MZI.

The peculiar behavior of vanishing single-slit interference necessitates an answer to the question "how does a particle passing through one slit sense if the other slit is open or closed?" when interference is considered from the perspective of a single quantum particle. This single particle behavior has been explained theoretically in terms of a non-local exchange of modular momentum by Y. Aharonov et al. in "Modular Variables in Quantum Theory", *Int. J. Theor. Phys.* 2 213-19 (1969) and "Deterministic Quantum Interference Experiments", *Int. J. Theor. Phys.* 3 443-48 (1970).

Despite ongoing research in quantum mechanics, there have been no direct experimental observations of this exchange to support this explanation. This is due to the fact that the conditions required to observe it are precisely those that make the associated modular variable completely uncertain and unobservable. Recently, an experimental methodology has been suggested that uses weak measurements performed on pre- and post-selected ensembles of particles could be exploited in order to observe an effect induced by a non-local exchange of modular momentum. This methodology has been illustrated by a "gedanken" experiment using a twin consecutive MZI to duplicate relevant aspects of the two-slit interference experiment, as described by J. Tollaksen et al., in "Quantum interference experiments, modular variables and weak measurements", *New J. of Phys.* 12 013023 (2010).

Researchers at the Naval Surface Warfare Center, Dahlgren Division performed an optical twin MZI weak value experiment similar to that described in the above "gedanken" experiment. This experiment yielded measured weak values that were consistent with the associated theoretical predictions concerning the effect induced by a non-local exchange of modular momentum, as reported by S. Spence et al. in "Experimental Evidence for a Dynamical Non-Locality Induced Effect in Quantum Interference Using Weak Values", arXiv:1010.3289v1 (2010), accepted for publication in *Found. Phys.*, electronically available at http://arxiv.org/PS_cache/arxiv/pdf/1010/1010.3289v1.pdf.

Theory

Modular Momentum and Dynamical Non-Locality:

Consider a quantum particle propagating in the positive y-direction perpendicular to the plane of two symmetric slits that are separated by a distance l in the x-direction. The right and left slits are designated as respectively located at x and x−l. At time t after the particle passes through the slits, the particle's wavefunction is the superposition:

$$\psi(x, y, z, t) = \frac{1}{\sqrt{2}} \{\varphi(x - l, y, z, t) + e^{i\alpha}\varphi(x, y, z, t)\}, \quad (1)$$

where the φ's are assumed to be identical "wave packets" which do not overlap at t=0, and α is their relative phase.

Information about phase α can be obtained from the spatial interference pattern $|\psi(x,y,z,\tau)|^2$ produced by an ensemble of such particles on a screen parallel to and at an appropriate distance d from the plane of the slits at time τ>0. However, there are no local measurements using operators of the form $\hat{x}^j\hat{p}_x^k$, where j and k are non-negative integers, that can be performed upon the initial non-overlapping "wave packets" that will determine phase α. The relative phase α is thus a non-local feature of quantum mechanics.

The induced momentum uncertainty and the Heisenberg uncertainty principle are traditionally used to explain the loss of the interference pattern when one slit is closed. However, measuring which slit the particle passes through does not necessarily increase the momentum uncertainty. This, together with the fact that position and momentum observables along with their moments are not sensitive to relative phase (prior to "wave packet" overlap), suggests that these observables, as well as the Heisenberg uncertainty principle, are not the appropriate physical concepts for describing quantum interference phenomena.

However, the operator $$e^{-\frac{i}{\hbar}\hat{p}_x l}$$

and its modular property do provide a rational physical basis for describing quantum interference. Note that $$\hbar = \frac{h}{2\pi}$$

represents the reduced Planck constant. Unlike the operators $\hat{x}^j\hat{p}_x^k$, the expectation value of the operator $$e^{-\frac{i}{\hbar}\hat{p}_x l}$$

with respect to ψ(x,y,z,t) is sensitive to α, even when the two "wave packets" don't overlap. This sensitivity results from the action of $$e^{-\frac{i}{\hbar}\hat{p}_x l}$$

upon φ(x,y,z,t), which overlaps the two "wave packets" in eqn. (1) by translating φ(x,y,z,t) to φ(x−l,y,z,t).

Additionally, because the exponential expression $$e^{-\frac{i}{\hbar}\hat{p}_x l}$$

is invariant under the replacement form:

$$\hat{p}_x \rightarrow \hat{p}_x - n\frac{\hbar}{l}, \text{ such that } n = 0, \pm 1, \pm 2, \ldots, \quad (2)$$

where because:

$$e^{-\frac{i}{\hbar}\left(-n\frac{\hbar}{l}\right)l}e^{2in\pi} = 1, \quad (3)$$

the expression depends upon values of the modular momentum:

$$p_x \bmod\left(n\frac{\hbar}{l}\right) \equiv p_{x,mod} \in I \equiv \left[0, \frac{\hbar}{l}\right], \quad (4)$$

instead of those of $p_x$.

This modular property establishes a fundamental relationship between modular momentum uncertainty and quantum interference via the complete uncertainty principle: "$\hat{p}_{x,mod}$ is completely uncertain (i.e., all its values are uniformly distributed over I) if and only if the condition:

$$\left\langle e^{-\frac{i}{\hbar}n p_x \frac{l}{\hbar}}\right\rangle = 0 \quad (5)$$

is satisfied for every positive integer n", where $i=\sqrt{-1}$ is the imaginary unit.

Applying this principle in eqn. (5) to the two slit case reveals the following phenomenon: While the required expectation value with respect to ψ(x,y,z,t) does not vanish for n=1, that expectation value does vanish for every n when the expectation value is with respect to φ(x,y,z,t). Thus, when the left slit is closed, i.e., it is known that the particle passed through the right slit, then $\hat{p}_{x,mod}$ becomes completely uncertain so that all knowledge about $p_{x,mod}$ is lost.

The Heisenberg equation of motion provides the formalism for describing dynamical non-locality. In particular, contrast the classical time evolution of $$e^{-\frac{i}{\hbar}p_x l}$$

with that of quantum mechanical modular operator $$e^{-\frac{i}{\hbar}\hat{p}_x l}$$

in the Heisenberg picture. Note that this modular operator is not an observable, but rather is used for purposes of explanation. Classically:

$$\frac{d}{dt}e^{-\frac{i}{\hbar}p_x l} = \left(\frac{d}{dp_x}e^{-\frac{i}{\hbar}p_x l}\right)\frac{dp_x}{dt} = \frac{i}{\hbar}\left(\frac{dV(x)}{dx}\right)e^{-\frac{i}{\hbar}p_x l}, \quad (6)$$

where $V(x)$ is the spatially dependent potential and $p_x$ is the modular momentum.

When the system is described by the general one-dimensional Hamiltonian given by:

$$\hat{H} = \frac{\hat{p}_x^2}{2m} + V(\hat{x}), \quad (7)$$

such that m is an integer, then the Heisenberg equation of motion for the operator $$e^{-\frac{i}{\hbar}\hat{p}_x l}$$

yields:

$$\frac{d}{dt}e^{-\frac{i}{\hbar}\hat{p}_x l} = \frac{i}{\hbar}\left[\hat{H}, e^{-\frac{i}{\hbar}\hat{p}_x l}\right] \quad (8)$$

$$= \frac{i}{\hbar}\left(V(\hat{x}) - e^{-\frac{i}{\hbar}\hat{p}_x l}V(\hat{x})e^{\frac{i}{\hbar}\hat{p}_x l}\right)e^{-\frac{i}{\hbar}\hat{p}_x l}.$$

Let the expression:

$$V(\hat{x}) - e^{-\frac{i}{\hbar}\hat{p}_x l}V(\hat{x})e^{\frac{i}{\hbar}\hat{p}_x l} \equiv \mathcal{D}(\hat{x}, \hat{p}_x, l), \quad (9)$$

as a difference potential, such that in the $\{|x\rangle\}$ representation:

$$\langle x|\mathcal{D}(\hat{x}, \hat{p}_x, l)|x\rangle = \langle x|V(\hat{x})|x\rangle - \left\langle x\left|e^{-\frac{i}{\hbar}\hat{p}_x l}V(\hat{x})e^{\frac{i}{\hbar}\hat{p}_x l}\right|x\right\rangle \quad (10)$$

$$= V(x) - V(x - l),$$

where $V(x)$ is the potential for the right slit and $V(x-l)$ is the potential for the left slit. It is clear that unlike eqn. (6), which denotes a local force-dependent differential equation, eqn. (8) is non-local due to its dependency on the potential at two distinct locations—i.e., there are no forces involved. In fact, this effectively describes the scalar Aharonov-Bohm effect.

The behavior of quantum particles in the presence of slits can be interpreted from an analogous perspective. For example, suppose a quantum particle approaches the screen with only one open slit. If—as the particle reaches this slit—the second slit is opened, then the modular momentum of the particle changes non-locally as a result of the associated change in potential. For additional details concerning the theory of modular momentum and dynamical non-locality, one can consult the Aharonov and Tollaksen references.

Weak Measurements and Weak Values:

Although the exchange of modular momentum is not directly observable, dynamical non-locality has been suggested to induce effects that can be observed using weak measurements of pre- and post-selected ensembles of particles. Weak measurements arise in the von Neumann description of a quantum measurement at time $t_0$ of a time-independent observable $\hat{A}$ that describes a quantum system in an initial fixed pre-selected state:

$$|\psi_i\rangle = \Sigma_j c_j |a_j\rangle \text{ at } t_0, \quad (11)$$

where the set J indexes the eigenstates $|a_j\rangle$ of $\hat{A}$ and $c_j$ are complex valued expansion coefficients. In this description the Hamiltonian for the interaction between the measurement apparatus and the quantum system is:

$$\hat{H} = \gamma(t)\hat{A}\hat{p}. \quad (12)$$

Here the interaction strength $\gamma$:

$$\gamma(t) = \gamma\delta(t-t_0) \quad (13)$$

defines the strength of the measurement's impulsive interaction at $t_0$ and operator $\hat{p}$ is the momentum operator for the pointer of the measurement apparatus which is in the initial state $|\phi\rangle$. Let $\hat{q}$ be the pointer's position operator that is conjugate to $\hat{p}$, and assume that $\langle q|\phi\rangle \equiv \phi(q)$ is real valued with definition:

$$\langle q \rangle = \langle \phi|\hat{q}|\phi \rangle = 0. \quad (14)$$

Prior to the measurement the pre-selected system and the pointer are in the tensor product state $|\psi_i\rangle|\phi\rangle$. Immediately following the measurement the combined system is in the state:

$$|\Phi\rangle = e^{-\frac{i}{\hbar}\int \hat{H}dt}|\psi_i\rangle|\varphi\rangle = \sum_J c_j e^{-\frac{i}{\hbar}\gamma a_j \hat{p}}|\varphi\rangle|a_j\rangle, \quad (15)$$

where use has been made of the fact that:

$$\int Hdt = \gamma\hat{A}\hat{p}. \quad (16)$$

The exponential factor in eqn. (16) is the translation operator $\hat{S}(\gamma a_j)$ for $|\phi\rangle$ in its q-representation. It is defined by the action:

$$\langle q|\hat{S}(\gamma a_j)|\phi \rangle = \langle q - \gamma a_j|\phi \rangle = \phi(q - \gamma a_j), \quad (17)$$

which translates the pointer's wave-function over a distance $\gamma a_j$ parallel to the q-axis. The q-representation of the combined system and pointer state is:

$$\langle q|\phi\rangle\langle =\Sigma_j c_j\rangle q|\hat{S}(\gamma a_j)|\phi\rangle |a_j\rangle \quad (18)$$

When the measurement interaction is strong, the quantum system is appreciably disturbed and its state "collapses" to an eigenstate $|a_n\rangle$ leaving the pointer in the state $\langle q|\hat{S}(\gamma a_n)|\phi\rangle$ with probability $|c_n|^2$. Strong measurements of an ensemble of identically prepared systems yield:

$$|\psi\langle A\rangle = \gamma\langle \psi_i|\hat{A}|\psi_i\rangle \quad (19)$$

as the centroid of the pointer probability distribution:

$$|\langle q|\Phi\rangle|^2 = \Sigma_j |c_j|^2 |\langle q|\hat{S}(\gamma a_j)|\phi\rangle|a_j\rangle|^2 \qquad (20)$$

with $\langle \hat{A}\rangle$ as the measured value of $\hat{A}$.

A weak measurement of $\hat{A}$ occurs when the interaction strength $\gamma$ is sufficiently small so that the system remains essentially undisturbed, and the certainty $\Delta q$ is much larger than $\hat{A}$'s eigenvalue separation. In this case, eqn. (20) is the superposition of broad overlapping $|\langle q|\hat{S}(\gamma a_j)|\phi\rangle|a_j\rangle|^2$ terms. Although a single measurement provides little information about $\hat{A}$, many repetitions allow the centroid of eqn. (20) to be determined to any desired accuracy.

If a system state is post-selected after a weak measurement is performed, then the resulting pointer state is:

$$|\Psi\rangle \equiv \langle \psi_f|\Phi\rangle = \Sigma_j c'_j {}^* c_j \hat{S}(\gamma a_j)|\phi\rangle, \qquad (21)$$

where $c'_j{}^*$ is the complex conjugate of coefficient $c'_j$, and $$|\psi_f\rangle = \Sigma_j c'_j |a_j\rangle, \langle\psi_f|\psi_f\rangle \neq 0 \qquad (22)$$

is the post-selected state at $t_0$.

Because the translation operator can be expressed as summation:

$$\hat{S}(\gamma a_j) = \sum_{m=0}^{\infty} \frac{[-i\gamma a_j \hat{p}/\hbar]^m}{m!}, \qquad (23)$$

then $$|\Psi\rangle = \sum_j c'^*_j c_j \left\{ 1 - \frac{i}{\hbar}\gamma A_w \hat{p} + \sum_{m=2}^{\infty} \frac{[-i\gamma \hat{p}/\hbar]^m}{m!}(A^m)_w \right\} |\varphi\rangle \qquad (24)$$

$$\approx \left\{ \sum_j c'^*_j c_j \right\} e^{\frac{i}{\hbar}\gamma A_w \hat{p}} |\varphi\rangle,$$

in which $A_w$ represents weak values of the observable $\hat{A}$.

In this case the pointer state can be approximated as:

$$|\Psi\rangle \approx \langle\psi_f|\psi_i\rangle \hat{S}(\gamma A_w)|\phi\rangle \qquad (25)$$

so that:

$$|\langle q|\Psi\rangle|^2 \approx |\langle\psi_f|\psi_i\rangle|^2 |\langle q|\hat{S}(\gamma ReA_w)|\phi\rangle|^2 \qquad (26)$$

or, alternatively pointer's position distribution profile can be expressed as:

$$|\Psi(q)|^2 \approx |\langle\psi_f|\psi_i\rangle|^2 |\phi(q - \gamma ReA_w)|^2 \qquad (27)$$

Here, the $m^{th}$ moment of the weak value of $\hat{A}$ is:

$$(A^m)_w = \frac{\sum_j c'^*_j c_j a_j^m}{\sum_j c'^*_j c_j} = \frac{\langle\psi_f|\hat{A}^m|\psi_i\rangle}{\langle\psi_f|\psi_i\rangle}, \qquad (28)$$

with the weak value $A_w$ of $\hat{A}$ defined by:

$$A_w \equiv (A^1)_w = \frac{\langle\psi_f|\hat{A}|\psi_i\rangle}{\langle\psi_f|\psi_i\rangle} \qquad (29)$$

From this expression it is obvious that $A_w$ is—in general—a complex valued quantity that can be calculated directly from theory.

Because $\phi(q)$ is real valued, then eqn. (27) corresponds to a broad pointer position distribution with a single peak at:

$$\langle q\rangle = \gamma ReA_w, \qquad (30)$$

with $ReA_w$ as the measured value of $\hat{A}$. This occurs when both of the following inequalities relating interaction strength $\gamma$ and the pointer momentum uncertainty $\Delta p$ are satisfied by:

$$\Delta p \ll \frac{\hbar}{\gamma}|A_w|^{-1} \text{ and } \Delta p \ll \min_{(m=2,3,\ldots)} \frac{\hbar}{\gamma}\left|\frac{A_w}{(A^m)_w}\right|^{\frac{1}{m-1}}, \qquad (31)$$

as reported by I. M. Duck et al., "The sense in which a 'weak measurement' of a spin–½ particle's spin component yields a value 100", *Phys. Rev. D* 40 2112-17 (1989); and A. D. Parks et al., "Observation and measurement of an optical Aharonov-Albert-Vaidman effect", *Proc. Roy. Soc. Lond. A* 454 2997-3008 (1998).

It is important to note that although the weak measurement of $\hat{A}$ occurs at time $t_0$ so that pre- and post-selected states $|\psi_i\rangle$ and $|\psi_f\rangle$ exist at $t_0$, these are pre-selected and post-selected at times $t_i < t_0$ and $t_f > t_0$, respectively. Therefore, the pre-selected state $|\psi_i\rangle$ is propagated forward in time from $t_i$ to $t_0$ and the post-selected state $|\psi_f\rangle$ is propagated backward in time from $t_f$ to $t_0$ in order to calculate $A_w$ at $t_0$.

Further background information concerning the theoretical and experimental aspects of weak measurements and weak values is available in the Tollaksen, Duck and Parks references, as well as by Y. Aharonov et al., "How the Result of a Measurement of a Component of a Spin–½ Particle Can Turn Out to be 100?", *Phys. Rev. Lett.* 60 1351-54 (1988), known in the literature as "AAV"; Y. Aharonov et al., "Properties of a quantum system...", *Phys. Rev. A* 41 11-20 (1990); N. W. M. Ritchie et al., "Realization of a Measurement of a 'Weak Value'", *Phys. Rev. Lett.* 66 1107 (1991); O. Hosten et al., "Observation of the Spin Hall Effect of Light via Weak Measurements", *Science* 319 5864 787-90 (2008); and P. Dixon et al., "Ultrasensitive Beam Deflection Measurement via Interferometric Weak Value Amplification", *Phys. Rev. Lett.* 102 173601 (2009).

Device Description

As mentioned previously, the ODNIB employs weak measurements of a pre- and post-selected photon current (single photon or classically intense coherent light) in a small monolithic twin MZI to establish and maintain a superposition 0/1 binary state in the first MZI and uses the effect induced by non-local exchanges of modular momentum in the second MZI to change the binary state of the first MZI. (Conventionally, zero and one denote spin states "down" and "up", respectively.)

An edge MZI can be constructed with only a single input port. In practice, there are two input ports, such that the input port not depicted would have a quantum vacuum ket state $|vac\rangle$ entering that MZI. The vacuum state is a non-zero fluctuation of the quantized radiation field without a photon associated with that field. Some aspects of the quantum random-walk can be studied with the twin MZI because of its two-step depth structure (i.e., without width) of the quantum random-walk. The input light-wave can be a continuous quantum state such as the quantum coherent state or a quantum squeezed state.

For example, FIG. 1 illustrates a simplified twin Mach-Zehnder Interferometer (MZI) structure in a plan diagram 100. Upper photons 110 and a lower vacuum state 120 enter a first beam-splitter (BS1) 130 by respective paths R1 and L1. Second and third beam-splitters (BS2, BS3) 140, 150 are disposed further downstream. The photons 110 proceed to one of first and second mirrors (M1, M2) 160, 170 and reflect to the second beam-splitter (BS2) 140. For purposes of explanation, the vacuum state 120 is reflected by the third mirror (M3) 180. From the beam-splitter 140, the photons 110 continue to fourth mirror (M4) 190 and are reflected to the third beam-splitter (BS3) 150 from which they exit.

To recap, the beam-splitters are labeled BS1 130, BS2 140, and BS3 150. The mirrors are labeled M1 160, M2 170, M3 180, and M4 190. The paths followed by the light (as photons 110) are labeled using the traditional "right" (R) and "left" (L) notation R1, R2, . . . , R6, L1, L2, . . . , L6.

The photon paths oriented diagonally downward (towards the right) are denoted by R1, R2, R3, R4, R5 and R6. The photon paths oriented diagonally upward (towards the right) are denoted by L1, L2, L3, L4, L5 and L6. The beam-splitters 130, 140, 150 have a plate configuration with a 45° angle of incidence for incoming light, which can be used in a cube-style beam-splitter as described subsequently.

These principles can be extended to geometries for a monolithic (single-piece) multiple MZI. The objectives of a quantum optics experiment may be compromised, if instabilities occur in the path of the photons within the experimental apparatus. These instabilities can be a result of thermal gradients and fluctuations, as well as vibrations. The quantum optics experimental community has so far used active stabilization at most for keeping optical elements fixed relative to each other.

Figure 2:
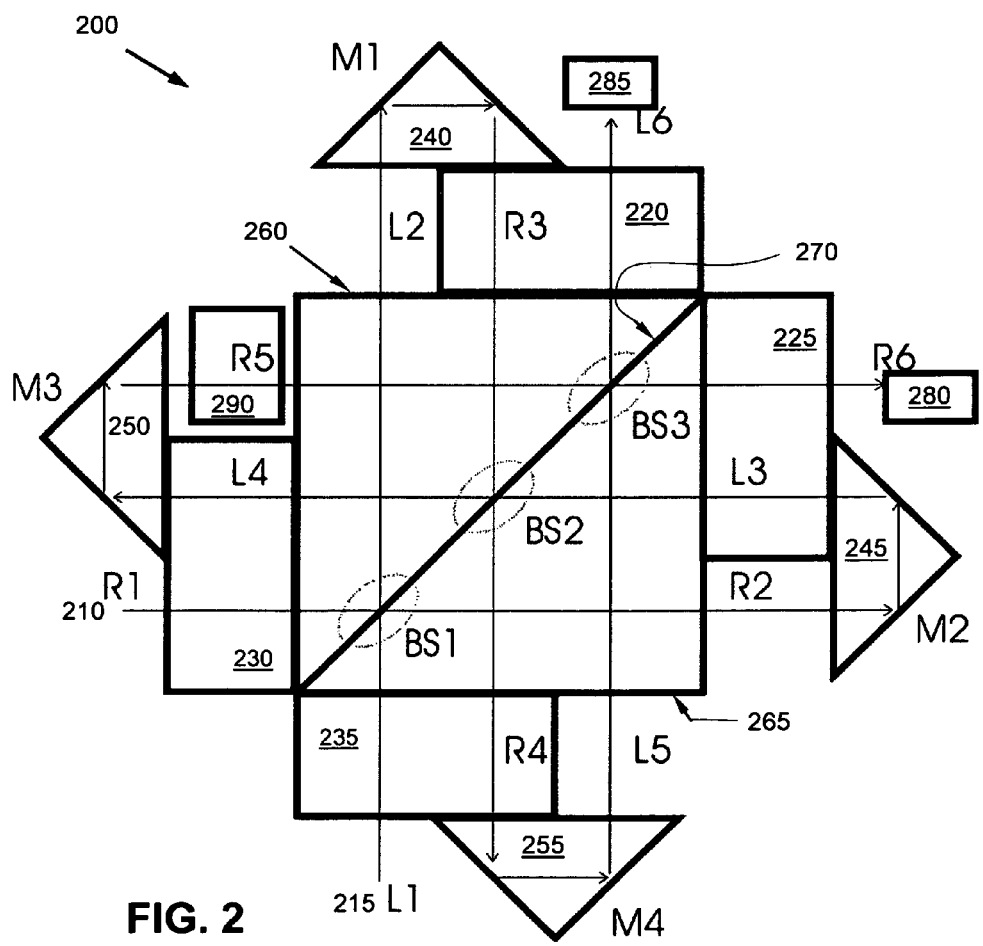
FIG. 2 is a plan view of a monolithic twin MZI.

The optical elements, such as mirrors, lenses, and beam-splitters are typically held in separate opto-mechanical mounts. Outside of this community, researchers and device developers are migrating toward more monolithic constructions. To provide for several experiments that utilize MZI components joined to each other as shown in FIG. 2 as a plan view diagram 200 for a twin MZI monolith. The monolith mitigates problems associated with path instabilities.

FIG. 2 shows input photons 210 and vacuum state 215 respectively traveling along horizontal path R1 and vertical path L1. The twin monolithic design comprises a beam-splitter cube and a spacer-trombone prism on four of the cube faces. The monolith has to be carefully aligned during construction, so that each MZI is functional and that there are spaces for probes to be inserted within the monolith for the experiments. Artisans of ordinary skill will recognize that the trombone prism (e.g., porro prism) translates a beam so that a photon exits in a direction opposite and parallel to its entrance, thereby enabling the monolith optics to function. The trombone prism, as shown in the schematic 200, functionally represents two right-isosceles mirrors rather than a single mirror.

The twin MZI pair includes spacers 220, 225, 230, 235, porro prism mirrors 240 as M1, 245 as M2, 250 as M3, 255 as M4 and triangular prisms 260, 265 that form the beam-splitter cube with a diagonal interface 270 from lower left to upper right corners to form three beam-splitter intersections. The input photon 210 travels along path R1 through the third spacer 230 and the first prism 260, striking the interface 270 at a first intersection BS1. Similarly, the vacuum state 215 travels along path L1 through the fourth spacer 235 and the second prism 265, also striking the interface 270 at the first intersection BS1.

In a more generalized description, the MZI can be composed of a complimentary pair of right-isosceles triangular prisms, and several trombone reflector units. The triangular prisms 260 and 265 are configurable to physically join together along associated hypotenuse surfaces that form a beam-splitter interface 270, thereby producing a square beam-splitter having a square cross-section with four outer side surfaces. Each reflector unit 240, 245, 250 and 255 forms a right-isosceles mirror that rigidly faces a corresponding surface of the four outer side surfaces of the square beam-splitter. The MZI may preferably further include a spacer disposed between the corresponding surface and the each reflector unit.

The photons 210 can travel either horizontally along path R2 to the second mirror 245 to be offset and return along path L3 to a second intersection BS2, or else vertically along path L2 to the first mirror 240 and return along path R3 also to the second intersection BS2. Thus, ideally this is a vacuum state (distinct from that at 215) that proceeds horizontally along path L4 to the third mirror 250 to be offset and return along path R5 to a third intersection BS3. The photons 210 can proceed vertically along path R4 to the fourth mirror 255 and return along path L5 also to the third intersection BS3. The vacuum state implies the wave part of the wave/particle duality in quantum mechanics.

The photons 210 can then pass either horizontally through the second prism 265 and the second spacer 225 to exit along path R6 towards a horizontal detector 280, or else vertically through the first prism 260 and the first spacer 220 to exit along path L6 towards a vertical detector 285. The paths R2, R5, L2 and L5 each traverse through an access space between their respective mirrors 245 (M2), 250 (M3), 240 (M1), 255 (M4) and the prisms 260, 265 separated by the respective spacers 225, 230, 220, 235. The access spaces provide a region in which an experimenter can dispose a sample or other object into the optical beam path.

In brief, FIG. 2 is a schematic of the ODNIB's monolithic twin MZI. The second diagram 200 incorporates analogous notation as the first diagram 100 so that one can observe how the simplified twin MZI of FIG. 1 maps into the ODNIB. The combination of optical elements BS1, BS2, M1, and M2 comprise the first MZI and the combination BS2, BS3, M3, and M4 comprise the second MZI. The photon current enters along path R1 (defining the pre-selected state of L2) and exits along paths R6 and L6.

The first MZI is phase-tuned so that the photon exiting BS2 is along R4 only and the location of the first and second mirrors 240 and 245 (M1 and M2 respectively) are offset along the direction of L2 and R2. These offsets enable either of the gaps to facilitate active or passive phase tuning of weak interactions by an inserted optical window device (not shown) that when rotated causes small transverse beam shifts along the direction of L2.

The photon detector 280, being capable of measuring the image exiting R6, performs the weak measurements. These measurements are used to read the binary value via the spatial position of the average intensity of the photon beam along the line of the beam profile movement. The location of the photon detector and a phase tuned second MZI defines the L2 post-selected state $|\psi_f\rangle$ of the photon.

The second MZI can be phase-tuned in a similar manner as the first MZI, in which the gaps for the third and fourth mirrors 250 and 255 (M3 and M4 respectively) define the possible locations for a phase-tuning optical window device. The phase-tuning requirement of the second MZI requires that by temporarily blocking the path R2 provided by the spacer 225, any photon from path R3 will travel to the path R6 and reach the detector 280.

Artisans of ordinary skill will recognize that the optical windows used in phase-tuning the first and second MZIs will be slightly rotated and that the required gap can easily be determined from the required glass rotations, glass thickness, Snell's law, and so forth. Also, artisans of ordinary skill will recognize that the optical windows used in causing small transverse beam shifts along the direction of L2 in the first MZI will be rotated and that the required gap can easily be determined. Moreover, such artisans will recognize that there are equivalent devices that may be substituted for the optical windows to perform the same functions.

A small electronically controlled shutter 290 can be inserted and removed in the spatial "gap" along R5 between the mirror 250 and the prism 260. In the absence of the shutter 290 in the gap, there is no exchange of modular momentum, and the first MZI is in and remains in the "1" binary state. With the shutter 290 being in the gap, there is a non-local exchange of modular momentum between the shutter 290 and the current photons in the second MZI. This induces the binary state of the first MZI to change to and remain in the "0" binary state.

When the shutter 290 is removed from the gap, the first MZI returns to and remains in the "1" state. Artisans of ordinary skill will recognize that the shutter 290 can be physically inserted and removed, or alternatively be replaced by a switchable shutter that can be activated and deactivated.

The offset distance of mirror 240 (M1) by spacer 220 for an inserted weak interaction device at which the weakness of the interaction is varied for the weak measurement of the photon spatial mode projection operator as:

$$\hat{N}_L = |L2\rangle\langle L2|, \quad (32)$$

located in path L2 and an implicit weak measurement of the spatial mode projection operator:

$$\hat{N}_R = |R2\rangle\langle R2|, \quad (33)$$

located in path R2.

Let $(N_L)_{w,1}$ and $(N_R)_{w,1}$ be the weak values of $\hat{N}_L$ and $\hat{N}_R$ when there is no shutter 290 in the R5 gap, respectively, and $(N_L)_{w,2}$ and $(N_R)_{w,2}$ be their weak values when there is a shutter 290 in the gap. Without the shutter 290 in the gap, the binary state of the first MZI is defined by the weak value difference $(N_L)_{w,1} > (N_R)_{w,1} = 0$.

In this case, $(N_R)_{w,1}$ corresponds to no changes in the average location at the detector 285, whereas $(N_L)_{w,1}$ corresponds to the maximum changes with changes in the weak interactions as measured by the detector 280. Conducting measurements for the correct projection operator, necessitates either a detector 285 or else a it radians phase-shift in the second MZI to make the measurements at the detector 280.

When there is a shutter 290 in the R5 gap, the first MZI's binary state is $(N_L)_{w,2} = (N_R)_{w,2}$ and corresponds to lesser changes in average locations at the detector 280 due to changes in the weak interactions (and similarly greater changes at the detector 285). Thus, a "1" to a "0" state change in the first MZI corresponds to the degree of changes of the average intensity location at the detector 280 for $(N_L)_{w,1}$.

To show that these weak value differences define the binary state of the first MZI, is necessary to calculate their values using eqn. (29). For each of these weak values the pre-selected state is the spatial mode $|R1\rangle$. Propagation of the pre-selected state $|R1\rangle$ through the interferometer yields $$\frac{1}{\sqrt{2}}|R6\rangle$$

as the post-selected state which becomes $$\frac{1}{\sqrt{2}}|L2\rangle$$

when propagated back through the interferometer to where $\hat{N}_L(\hat{N}_R)$ is measured.

Because $|R1\rangle$ transformed by BS1 into $$\frac{1}{\sqrt{2}}(i|\rangle + |R2\rangle)$$

corresponds to the pre-selected state that is forward-propagated to where the measurement is conducted, then:

$$(N_L)_{w,1} = \frac{\left[-\frac{i}{\sqrt{2}}\langle L2|\right]N_L\left[\frac{1}{\sqrt{2}}(i|L2\rangle + |R2\rangle)\right]}{\left[-\frac{i}{\sqrt{2}}\langle L2|\right]\left[\frac{1}{\sqrt{2}}(i|L2\rangle + |R2\rangle)\right]} = 1. \quad (34)$$

Substituting $\hat{N}_R$ for $\hat{N}_L$ in eqn. (34) yields the weak value:

$$(N_R)_{w,1} = 0. \quad (35)$$

Thus, when there is no shutter 290 disposed within the gap, the binary state of the first MZI is "1".

When the shutter 290 is in the gap, the pre-selected state $|R1\rangle$ again becomes the post-selected state $$\frac{1}{\sqrt{2}}|R6\rangle$$

after propagation through the interferometer. However, this state becomes $$\frac{1}{2\sqrt{2}}(i|L2\rangle + |R2\rangle)$$

when propagated backwards to where the measurement at the detector 280 is made.

Again, using $$\frac{1}{\sqrt{2}}(i|L2\rangle + |R2\rangle)$$

as the forward propagated pre-selected state gives the weak value:

$$(N_L)_{w,2} = \frac{\left[\frac{1}{2\sqrt{2}}(-i\langle L2| + \langle R2|)\right]N_L\left[\frac{1}{\sqrt{2}}(i|L2\rangle + |R2\rangle)\right]}{\left[\frac{1}{2\sqrt{2}}(-i\langle L2| + \langle R2|)\langle L2|\right]\left[\frac{1}{\sqrt{2}}(i|L2\rangle + |R2\rangle)\right]} = \frac{1}{2}. \quad (36)$$

Substituting $\hat{N}_R$ for $\hat{N}_L$ in eqn. (35) also gives:

$$(N_R)_{w,2} = \frac{1}{2}. \quad (37)$$

The ODNIB is expected to have utility in quantum computing, switching applications, and operate as an invisible security gate. The Spence reference includes experimental verification of the effect induced by the non-local exchange of modular momentum, upon which the ODNIB is based.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A quantum dynamical non-locality device for establishing a photon in a binary state as a binary switch mechanism, said device comprising:
- a twin Mach-Zehnder interferometer (MZI) for directing the photon along a path, said twin MZI including:
  - first and second right-isosceles triangle prisms that join at an interface beam-splitter,
  - first and second trombone mirrors that respectively correspond to said first and second triangle prisms, each mirror reflecting the photon by an offset substantially perpendicular to photon's travel direction, and
  - first and second spacers respectively disposed between respective said prisms and said mirrors to produce first and second spatial gaps, such that said path includes said spacers and said gaps;
- a detector that detects a quantum state of the photon after passing said first and second prisms and said first and second mirrors; and
- a shutter that alternates between one of activation and deactivation within said first gap, wherein said shutter shifts said quantum state of the photon respectively between zero for activation and one for deactivation to provide binary state conditions for the switch mechanism based on weak measurements by said detector.

2. The device according to claim 1, wherein said path includes passing sequentially through said first spacer, said first prism, said second prism past said beam-splitter, said second gap, said second mirror, said second spacer, said second prism, said first prism past said beam-splitter, said first spacer, said first mirror, said first gap, said first prism, said second prism past said beam-splitter, and past second spacer to said detector.

3. The device according to claim 2, wherein said shutter is switchably disposed for insertion into upon activation and withdrawal therefrom upon deactivation within said first gap.

4. The device according to claim 1,
wherein said twin MZI further includes:
- a third trombone mirror that corresponds to said first triangle prism disposed respectively perpendicular to said first mirror, said third mirror reflecting the photon by said offset substantially perpendicular to photon's travel direction, and
- a third spacer disposed between said first prism and said third mirror to produce a third spatial gap, such that said path includes said third spacer and said third gap.

5. The device according to claim 4, wherein said path includes traversing sequentially through said first spacer, said first prism with reflection at said beam-splitter, said third gap, said third mirror, said third spacer, said first prism, reflection at said beam-splitter, said first spacer, said first mirror, said first gap, said first prism, said second prism past said beam-splitter, and past second spacer to said detector.

6. The device according to claim 5, wherein said shutter is switchably disposed for insertion into upon activation and withdrawal therefrom upon deactivation within said first gap.

7. The device according to claim 5, wherein said shutter is switchably withdrawn from said first gap and disposed within said third gap.

* * * * *